(12) United States Patent
Suzuki

(10) Patent No.: US 10,000,208 B2
(45) Date of Patent: Jun. 19, 2018

(54) VEHICLE CONTROL APPARATUS

(71) Applicant: Nissan Motor Co., Ltd., Yokohama-Shi, Kanagawa (JP)

(72) Inventor: Yasuhiro Suzuki, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days. days.

(21) Appl. No.: 15/320,469

(22) PCT Filed: Jun. 25, 2014

(86) PCT No.: PCT/JP2014/066861
§ 371 (c)(1),
(2) Date: Dec. 20, 2016

(87) PCT Pub. No.: WO2015/198426
PCT Pub. Date: Dec. 30, 2015

(65) Prior Publication Data
US 2017/0341642 A1  Nov. 30, 2017

(51) Int. Cl.
*B60W 30/09* (2012.01)
*B60W 30/095* (2012.01)
*G08G 1/16* (2006.01)

(52) U.S. Cl.
CPC ........ *B60W 30/09* (2013.01); *B60W 30/0953* (2013.01); *B60W 30/0956* (2013.01); *G08G 1/165* (2013.01); *G08G 1/166* (2013.01); *B60W 2550/302* (2013.01); *B60W 2550/306* (2013.01); *B60W 2550/308* (2013.01); *B60W 2720/106* (2013.01)

(58) Field of Classification Search
CPC .. B60W 10/06; B60W 30/08; B60W 30/0953; B60W 30/0956; B60W 50/0097; B60W 2520/10; G01C 21/00; G06K 9/00791; G06K 9/00805
See application file for complete search history.

(56) References Cited

U.S. PATENT DOCUMENTS

| 9,731,719 | B2* | 8/2017 | Niino | B60W 30/16 |
|---|---|---|---|---|
| 2005/0012604 | A1* | 1/2005 | Takahashi | G01S 13/931 340/435 |
| 2011/0313740 | A1* | 12/2011 | Ikeda | G05B 17/02 703/2 |

(Continued)

FOREIGN PATENT DOCUMENTS

| EP | 2827319 A1 | 1/2015 |
|---|---|---|
| JP | H11348598 A | 12/1999 |

(Continued)

*Primary Examiner* — Thomas G Black
*Assistant Examiner* — Ce Li Li
(74) *Attorney, Agent, or Firm* — Young Basile Hanlon & MacFarlane, P.C.

(57) ABSTRACT

A vehicle control apparatus detects position and speed of a host vehicle, detects position and speed of each of a stationary object and a moving object which are ahead of the host vehicle, calculates a passing position at which the host vehicle passes the moving object based on the position and the speed of the host vehicle and the position and the speed of the moving object, sets an area around the stationary object, and when the passing position is within the area, controls travel of the host vehicle to move the passing position out of the area.

11 Claims, 15 Drawing Sheets

(56) References Cited

U.S. PATENT DOCUMENTS

2014/0365104 A1\* 12/2014 Sasaki ............ B60W 30/18154
　　　　　　　　　　　　　　　　　　　　　　701/119
2015/0039156 A1\* 2/2015 Shibata .................... B60T 7/22
　　　　　　　　　　　　　　　　　　　　　　　701/1
2015/0353087 A1\* 12/2015 Niino ................... B60W 30/16
　　　　　　　　　　　　　　　　　　　　　　701/96

FOREIGN PATENT DOCUMENTS

| JP | 2005202678 A | 7/2005 |
| JP | 2008065481 A | 3/2008 |
| JP | 2008102690 A | 5/2008 |
| JP | 2013184563 A | 9/2013 |
| WO | 2013136870 A1 | 9/2013 |

\* cited by examiner

VEHICLE CONTROL APPARATUS

TECHNICAL FIELD

The present invention relates to a vehicle control apparatus.

BACKGROUND

A driving assistance apparatus for avoiding an oncoming vehicle which might drive off an oncoming lane is conventionally known (see Japanese Patent Application Publication No. 2008-102690). Based on the distance between a parked vehicle on the oncoming lane and the centerline, Japanese Patent Application Publication No. 2008-102690 determines whether the passing path of an oncoming vehicle interferes with a lane of a host vehicle. When determining that the passing path of the oncoming vehicle interferes with the host-vehicle lane, Japanese Patent Application Publication No. 2008-102690 either stops or slows down the host vehicle.

Japanese Patent Application Publication No. 2008-102690, however, does not consider the positional relation between the oncoming vehicle and the host vehicle. Japanese Patent Application Publication No. 2008-102690 stops the host vehicle even when the host vehicle can pass the oncoming vehicle without interference. This may impede the flow of traffic.

SUMMARY

The present invention has been made in consideration of the above problem, and has an object to provide a vehicle control apparatus that does not impede the flow of traffic by determining the positional relation between a host vehicle and an oncoming vehicle.

A vehicle control apparatus according to an aspect of the present invention detects position and speed of a host vehicle, detects position and speed of each of a stationary object and a moving object which are ahead of the host vehicle, calculates a passing position at which the host vehicle passes the moving object based on the position and the speed of the host vehicle and the position and the speed of the moving object, sets an area around the stationary object, and when the passing position is within the area, controls travel of the host vehicle to move the passing position out of the area.

DETAILED DESCRIPTION OF THE EMBODIMENTS

Embodiments of the present invention are described below with reference to the drawings. Throughout the drawings, the same components are denoted by the same reference signs to avoid repetitive description.

First Embodiment

Figure 1:
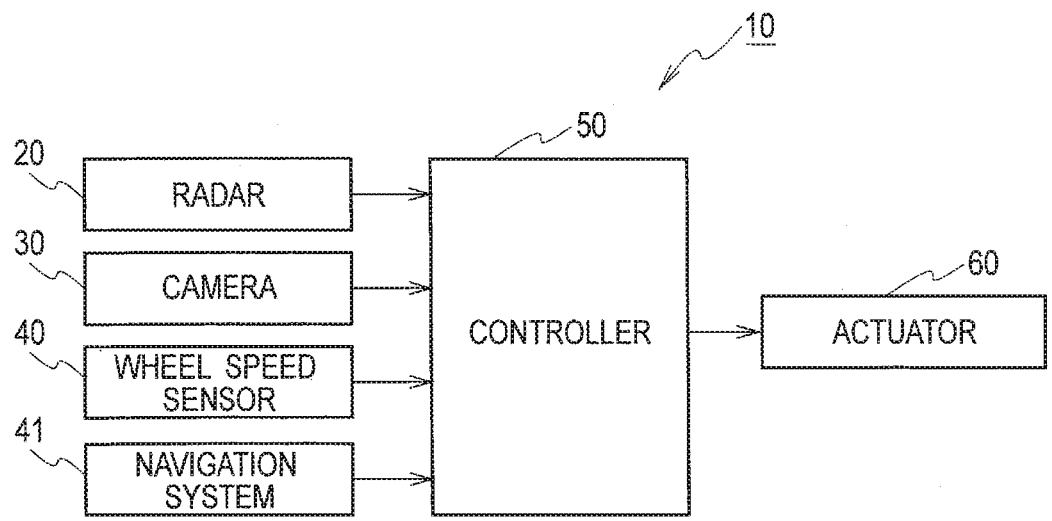
FIG. 1 is a block diagram showing the configuration of a vehicle control apparatus 10 according to a first embodiment of the present invention.

The configuration of a vehicle control apparatus 10 according to the present embodiment is described with reference to FIG. 1. As shown in FIG. 1, the vehicle control apparatus 10 according to the present embodiment includes a radar 20, a camera 30, a wheel speed sensor 40, a navigation system 41, a controller 50, and an actuator 60.

The radar 20 detects the presence, position, and speed of an object near a host vehicle, such as a vehicle, a motorcycle, a bicycle, or a pedestrian. The radar 20 also detects the relative speed of the object to the host vehicle C1. A laser radar or a millimeter-wave radar can be used as the radar 20. The radar 20 outputs detection data to the controller 50.

The camera 30 is mounted on the front of the host vehicle and captures an image of a scene ahead of the vehicle. The camera 30 is for example a camera having an imaging element such as a CCD or a CMOS. The camera 30 captures images successively in time and outputs the captured images to the controller 50.

The wheel speed sensor 40 detects the rotational speed of each wheel of the host vehicle to detect a vehicle speed. The wheel speed sensor 40 outputs the detected speed to the controller 50.

The navigation system 41 sets a travel route for the host vehicle and performs route guidance using positional information on the host vehicle acquired from a GPS. The navigation system 41 outputs, to the controller 50, the positional information on the host vehicle acquired from the GPS, map information on the surroundings, the location and shape of an intersection, traffic signal information, and the like.

The controller 50 controls the motional state of the vehicle (travel control) by performing various types of computation using the pieces of information obtained by the radar 20, the camera 30, the wheel speed sensor 40, and the navigation system 41 and then outputting control signals to the actuator 60 according to results of the computation. The controller 50 is configured as a computer integrally including a CPU and recording means such as a RAM, a ROM, and a hard disk.

The actuator 60 is for example an actuator that controls the pressure of braking liquid supplied to wheel cylinders of the vehicle. The controller 50 can brake the host vehicle by controlling the actuator 60 to generate braking force on the wheels.

Next, the configuration of the controller 50 is described with reference to FIG. 2.

Figure 2:
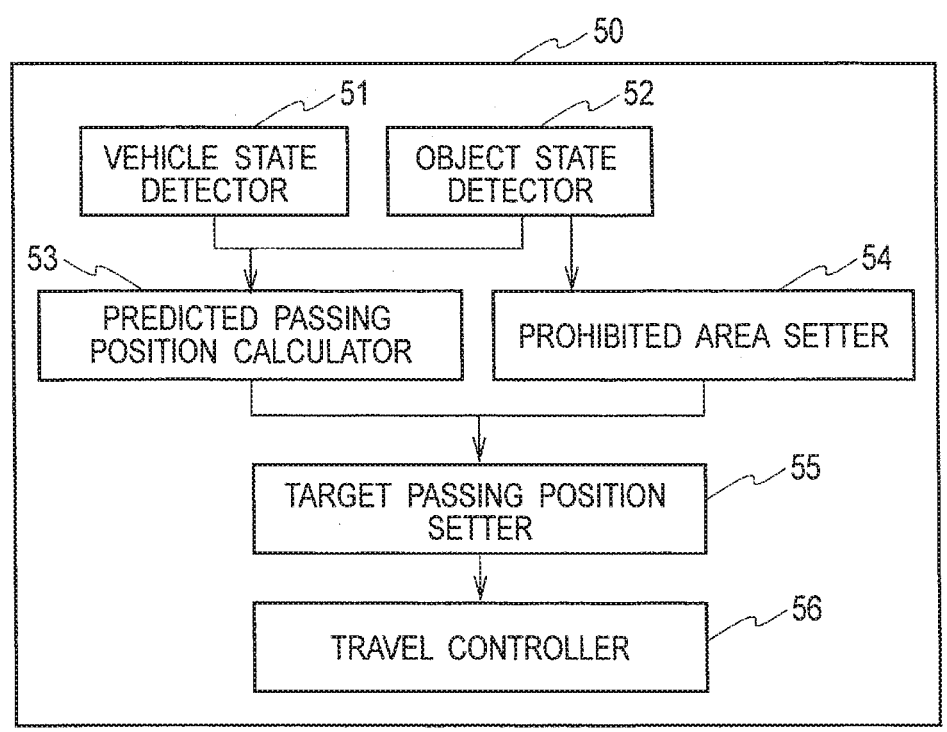
FIG. 2 is a block diagram showing the functional configuration of a controller 50 of the vehicle control apparatus 10 according to the first embodiment of the present invention.

As shown in FIG. 2, when viewed functionally, the controller 50 can be classified into a vehicle state detector 51, an object state detector 52, a predicted passing position calculator 53, a prohibited area setter 54, a target passing position setter 55, and a travel controller 56.

Operation of each classified configuration is now described with reference to FIG. 3.

Figure 3A:
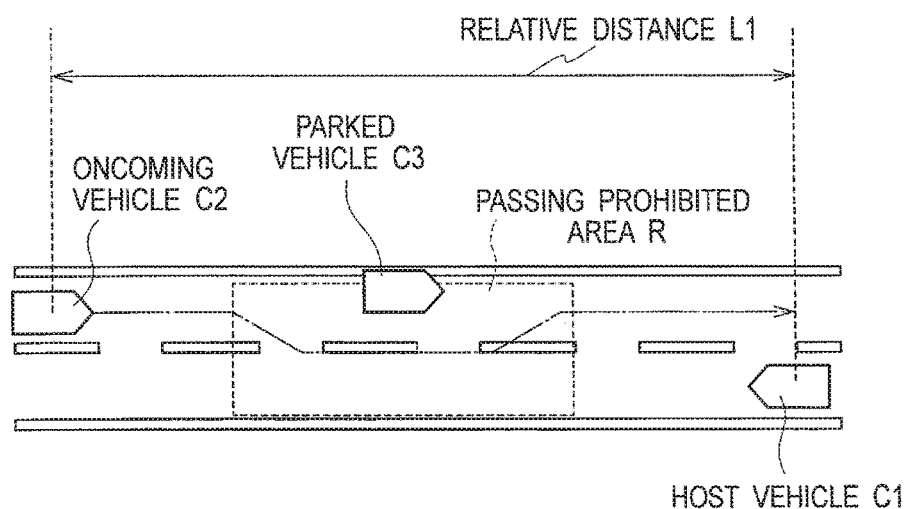
FIG. 3(a) is a diagram illustrating a scenario for performing passing control.

The vehicle state detector 51 reads a detection signal from the wheel speed sensor 40, and detects a speed V1 of the host vehicle C1 from the information thus read, the speed V1 being one of the driving states of the host vehicle C1 shown in FIG. 3(a). The vehicle state detector 51 then outputs the detected speed V1 to the predicted passing position calculator 53.

The object state detector 52 detects, based on a detection signal from the radar 20, the position and moving speed of an object (including a moving object and a stationary object) located near the host vehicle C1. Specifically, the object state detector 52 detects an oncoming vehicle C2 (a moving object) and a parked vehicle C3 (a stationary object) both on an oncoming lane, and detects a relative distance L1 between the host vehicle C1 and the oncoming vehicle C2, a relative speed ΔV2 of the oncoming vehicle C2 to the host vehicle C1, a relative speed ΔV3 of the parked vehicle C3 to the host vehicle C1, and the like. The object state detector 52 then outputs these detection data to the predicted passing position calculator 53 and the prohibited area setter 54.

The object state detector 52 includes an image processor to perform predetermined image processing on image signals captured by the camera 30. The object state detector 52 can thus detect the road conditions near the host vehicle C1.

The predicted passing position calculator 53 calculates a predicted passing position P3 based on the relative distance L1 between the host vehicle C1 and the oncoming vehicle C2, the speed V1 of the host vehicle C1, and a speed V2 of the oncoming vehicle C2. The predicted passing position P3 is a predicted position at which the host vehicle C1 and the oncoming vehicle C2 pass each other. First, the predicted passing position calculator 53 calculates the speed V2 of the oncoming vehicle C2 using the speed V1 of the host vehicle C1 and the relative speed ΔV2 of the oncoming vehicle C2 to the host vehicle C1 as shown below.

$$V2 = V1 + \Delta V2 \tag{1}$$

The predicted passing position calculator 53 then calculates the predicted passing position P3 shown in FIG. 3(b) by using the speed V1 of the host vehicle C1, the speed V2 of the oncoming vehicle C2, and the relative distance L1 between the host vehicle C1 and the oncoming vehicle C2 as shown below.

$$P3 = L1 \div (1 + V2 \div V1) \tag{2}$$

Figure 3B:
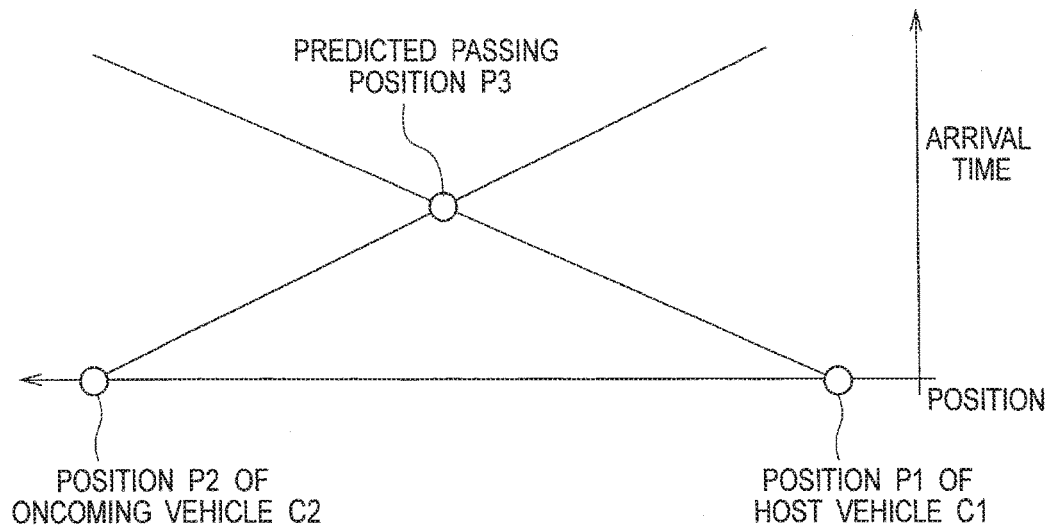
FIG. 3(b) is a diagram illustrating a predicted passing position P3.

Note that the predicted passing position P3 is calculated with its origin being a position P1 of the host vehicle C1 shown in FIG. 3(b). The positional relation between the position P1 of the host vehicle C1 and a position P2 of the oncoming vehicle C2 shown in FIG. 3(b) corresponds to the positional relation between the host vehicle C1 and the oncoming vehicle C2 shown in FIG. 3(a).

The predicted passing position calculator 53 outputs the calculated predicted passing position P3 to the target passing position setter 55.

The prohibited area setter 54 sets a passing prohibited area R around the parked vehicle C3 on the oncoming lane. An example of how to set the passing prohibited area R is described with reference to FIG. 3(a). The prohibited area setter 54 can determine, based on the size of the parked vehicle C3 and the distance between the parked vehicle C3 and the centerline, an area where the oncoming vehicle C2 enters the host-vehicle lane as shown in FIG. 3(a), and set this area as the passing prohibited area R.

The prohibited area setter 54 may determine whether to set the passing prohibited area R based on the relative speed ΔV3 of the parked vehicle C3 to the host vehicle C1. Specifically, the prohibited area setter 54 calculates a speed V3 of the parked vehicle C3 using the speed V1 of the host vehicle C1 and the relative speed ΔV3 of the parked vehicle C3 to the host vehicle C1 as shown below.

$$V3 = V1 + \Delta V3 \tag{3}$$

Then, when the speed V3 of the parked vehicle C3 is equal to or smaller than a preset speed threshold Vth, the prohibited area setter 54 determines that the parked vehicle C3 is a stationary object, and sets the passing prohibited area R around the parked vehicle C3. When the speed V3 of the parked vehicle C3 is larger than the speed threshold Vth, the prohibited area setter 54 determines that the parked vehicle C3 is a moving object, and does not set the passing prohibited area R around the parked vehicle C3. The speed threshold Vth may be set to zero.

The prohibited area setter 54 outputs the thus-set passing prohibited area R to the target passing position setter 55.

The target passing position setter 55 determines whether the predicted passing position P3 is within the passing prohibited area R. When determining that the predicted passing position P3 is within the passing prohibited area R, the target passing position setter 55 moves the predicted passing position P3 out of the passing prohibited area R and sets the moved position as a target passing position P4. The target passing position setter 55 then outputs the thus-set target passing position P4 to the travel controller 56. When determining that the predicted passing position P3 is not within the passing prohibited area R, the target passing position setter 55 sets the predicted passing position P3 as the target passing position P4.

The travel controller 56 controls the travel of the host vehicle C1 so that the host vehicle C1 can pass the oncoming vehicle C2 at the target passing position P4.

Figure 4:
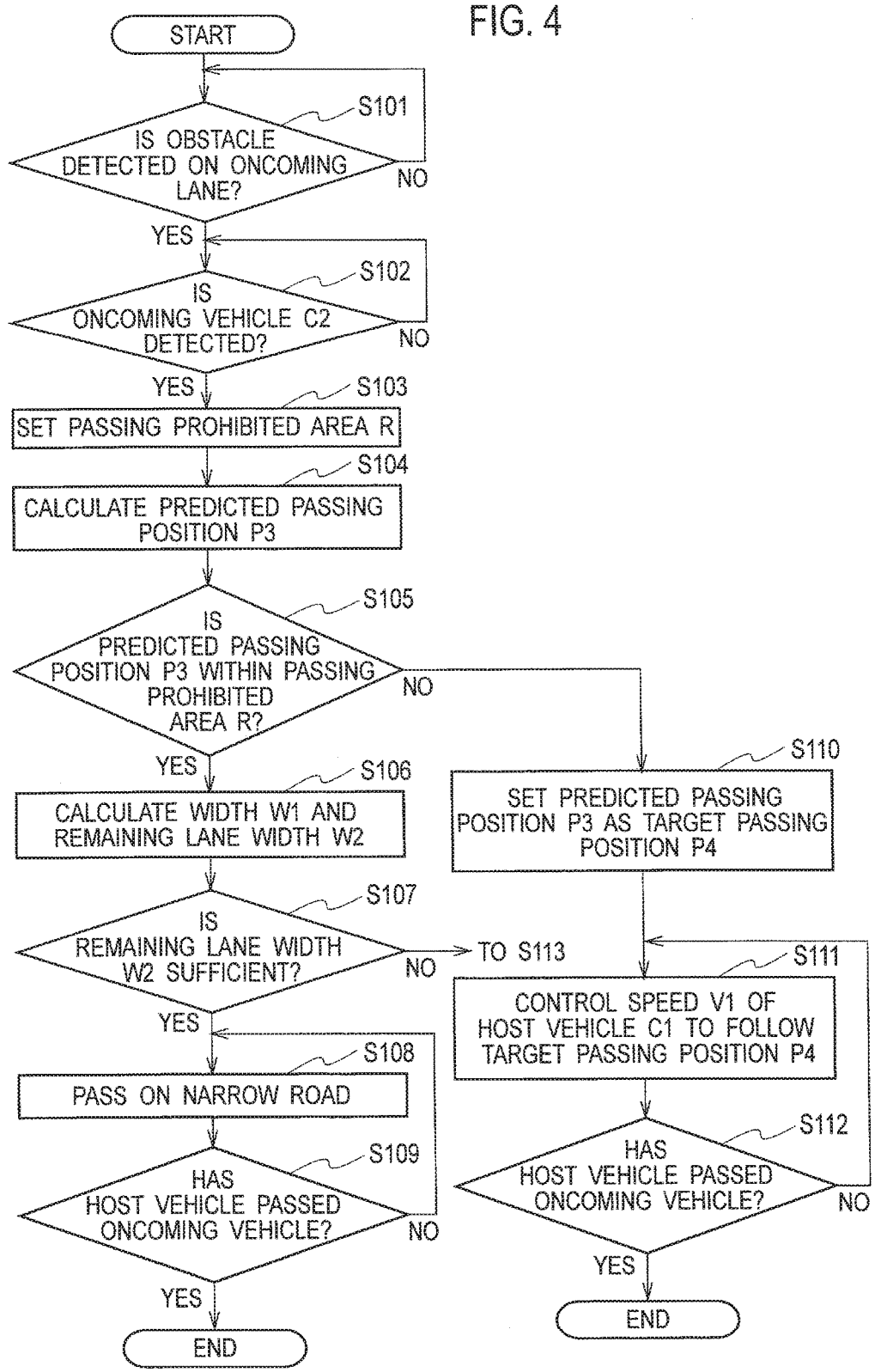
FIG. 4 is a flowchart illustrating an example of operation performed by the vehicle control apparatus 10 according to the first embodiment of the present invention.
Figure 5:
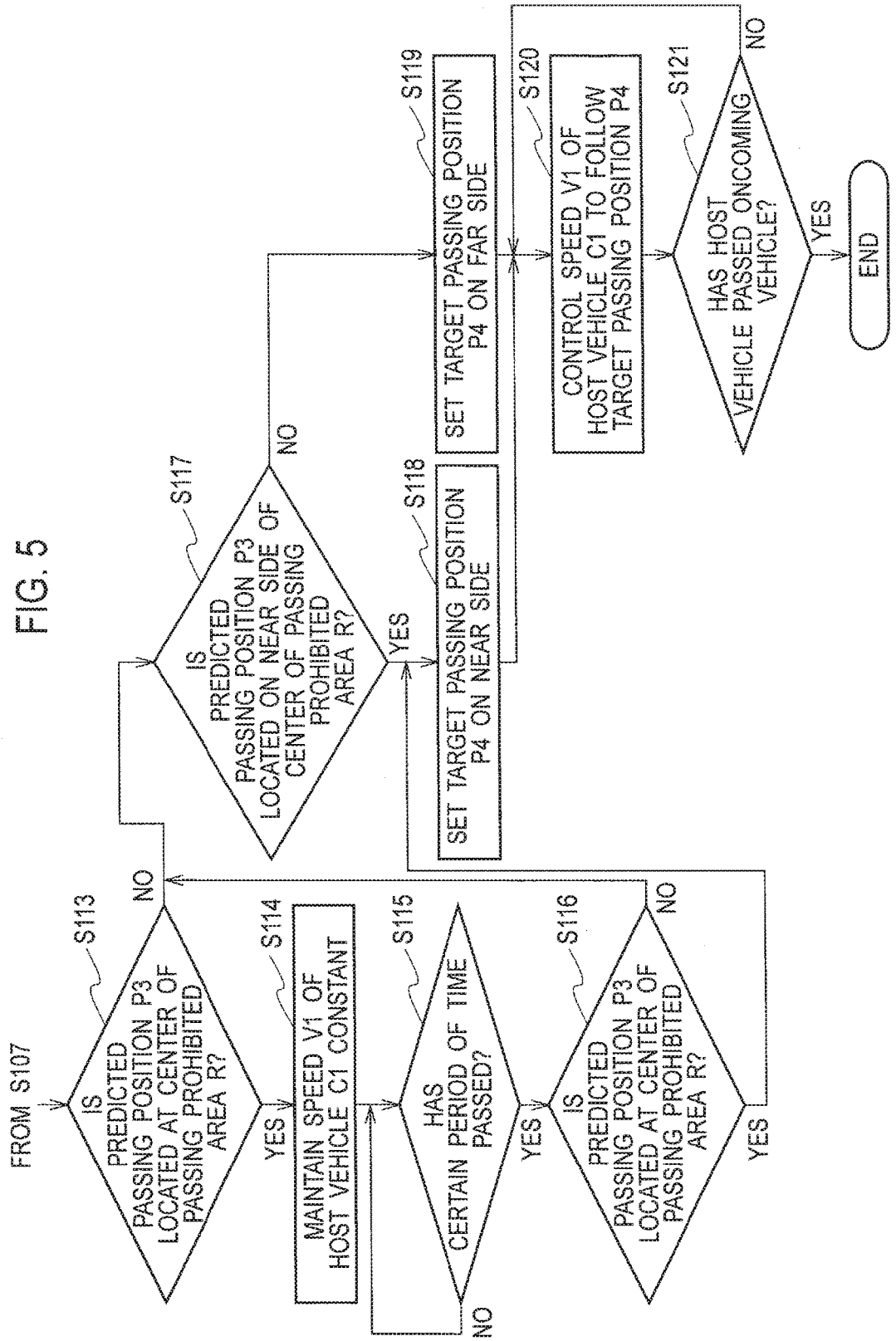
FIG. 5 is a flowchart illustrating an example of operation performed by the vehicle control apparatus 10 according to the first embodiment of the present invention.

Next, an example of operation performed by the vehicle control apparatus 10 according to the first embodiment is described with reference to the flowcharts shown in FIGS. 4 and 5. This processing is repeated in a predetermined cycle.

In Step S101, the object state detector 52 detects an obstacle on an oncoming lane. An obstacle herein is a stationary object which the oncoming vehicle C2 has to cross the centerline to pass, as shown in FIG. 3(*a*). When the object state detector 52 detects an obstacle, the processing proceeds to Step S102. When the object state detector 52 detects no obstacle, the object state detector 52 stands by. In this example, the object state detector 52 detects an obstacle, which is the parked vehicle C3 parked on the oncoming lane.

Next, in Step S103, the object state detector 52 detects the oncoming vehicle C2 on the oncoming lane. When the object state detector 52 detects the oncoming vehicle C2, the processing proceeds to Step S102. When the object state detector 52 detects no oncoming vehicle C2, the object state detector 52 stands by.

Next, in Step S103, the prohibited area setter 54 sets the passing prohibited area R near the parked vehicle C3.

Next, in Step S104, the predicted passing position calculator 53 calculates the predicted passing position P3.

Next, in Step S105, the target passing position setter 55 determines whether the predicted passing position P3 is within the passing prohibited area R. When the target passing position setter 55 determines that the predicted passing position P3 is within the passing prohibited area R, the processing proceeds to Step S106. When the target passing position setter 55 determines that the predicted passing position P3 is not within the passing prohibited area R, the processing proceeds to Step S110.

Figure 6:
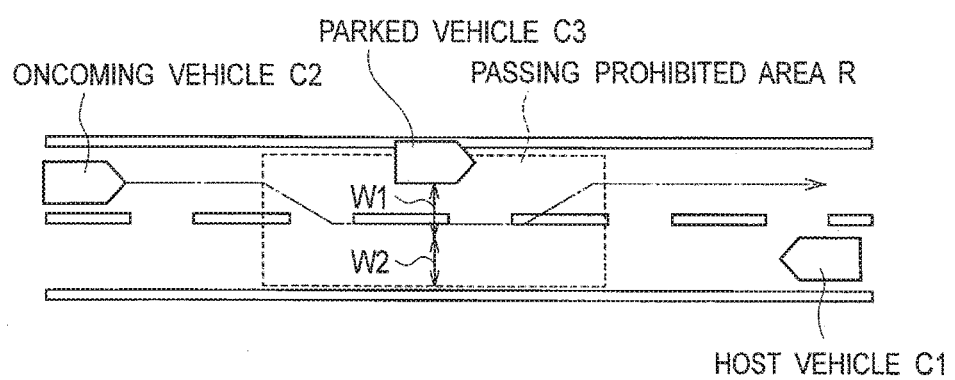
FIG. 6 is a diagram illustrating a width W1 and a remaining lane width W2.

Next, in Step S106, the object state detector 52 detects a width W1 required for the oncoming vehicle C2 to avoid and travel by the parked vehicle C3, as shown in FIG. 6. The width W1 can be obtained by adding the vehicle width of the oncoming vehicle C2 to a space needed to avoid contact with the parked vehicle C3. Next, the object state detector 52 detects a remaining lane width W2 obtained by subtracting the vehicle width of the parked vehicle C3 and the width W1 from the overall width of the travel lanes.

Next, in Step S107, the target passing position setter 55 determines whether the remaining lane width W2 is sufficient for the host vehicle C1 to avoid contact with the oncoming vehicle C2 when passing the oncoming vehicle C2. When the remaining lane width W2 is sufficient to avoid contact, the processing proceeds to Step S108. When the remaining lane width W2 is insufficient to avoid contact, the processing proceeds to Step S113.

Next, in Step S108, the travel controller 56 pulls the host vehicle C1 to the left side of the host-vehicle lane. When the host vehicle C1 passes the oncoming vehicle C2 on the narrow road (YES in S109), the processing ends.

Figure 7A:
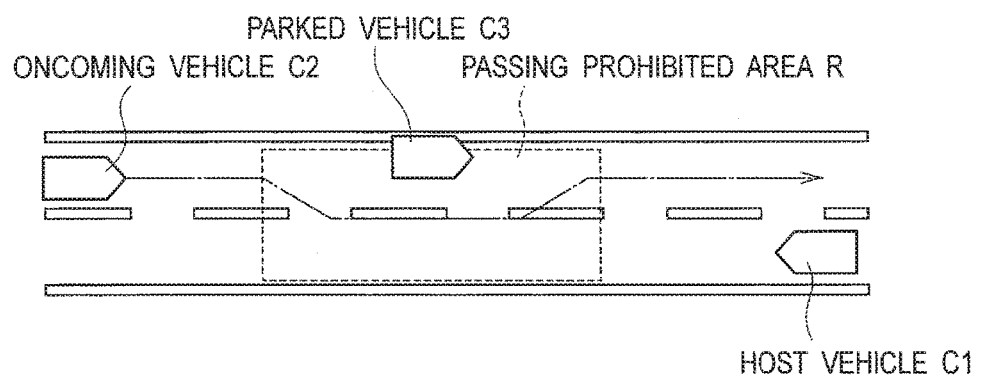
FIG. 7(a) is a diagram illustrating a scenario for performing passing control.
Figure 7B:
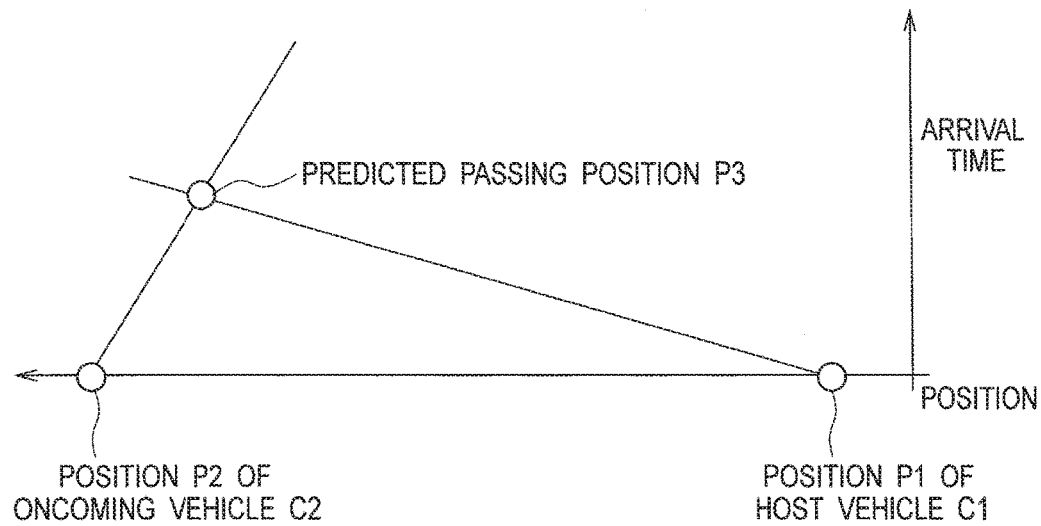
FIG. 7(b) is a diagram illustrating the predicted passing position P3.

In Step S110, since the predicted passing position P3 is outside the passing prohibited area R as shown in FIG. 7(*b*), the target passing position setter 55 sets the predicted passing position P3 as the target passing position P4.

Next, in Step S111, the travel controller 56 controls the actuator 60 of the host vehicle C1 so that the host vehicle C1 can pass the oncoming vehicle C2 at the target passing position P4, i.e., so that the host vehicle C1 may follow the target passing position P4. When the host vehicle C1 passes the oncoming vehicle C2 (YES in S112), the processing ends.

In Step S113, the target passing position setter 55 determines whether the predicted passing position P3 is at the center of the passing prohibited area R. The predicted passing position P3 being at the center of the passing prohibited area R means that, as shown in FIG. 3(*b*), the predicted passing position P3 is next to the right side of the parked vehicle C3. When the target passing position setter 55 determines that the predicted passing position P3 is at the center of the passing prohibited area R, the processing proceeds to Step S114. When the target passing position setter 55 determines that the predicted passing position P3 is not at the center of the passing prohibited area R, the processing proceeds to Step S117.

Figure 8A:
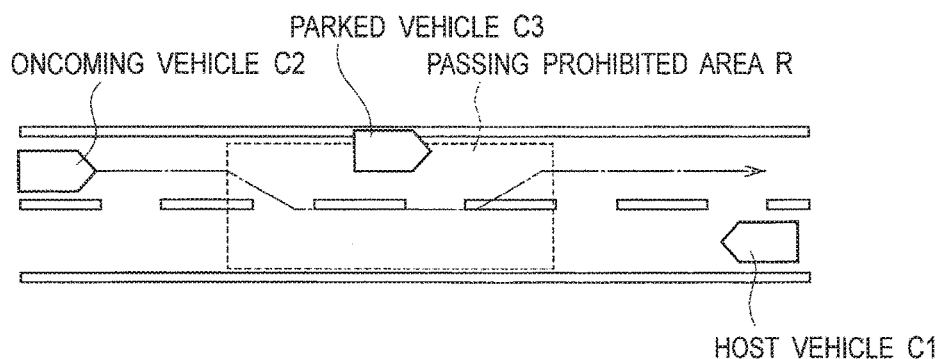
FIG. 8(a) is a diagram illustrating a scenario for performing passing control.
Figure 8B:
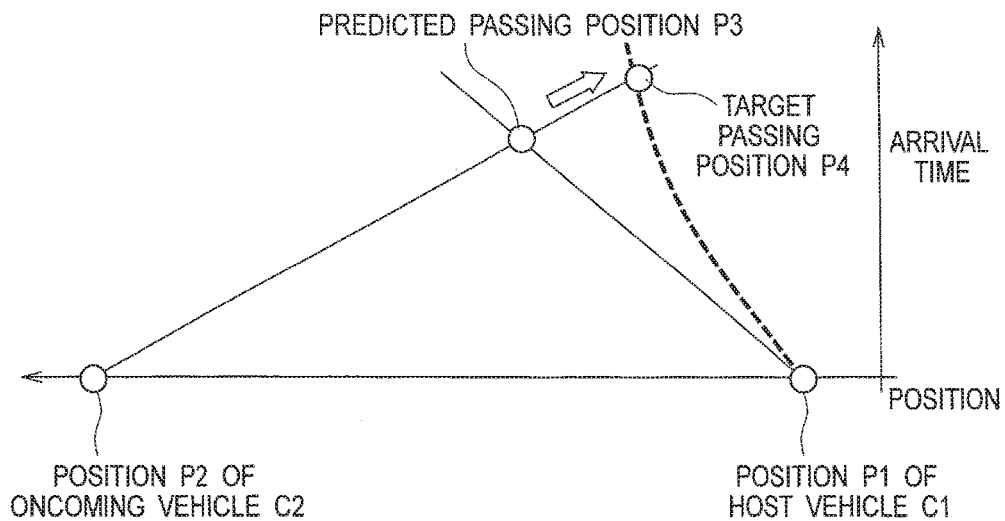
FIG. 8(b) is a diagram illustrating the predicted passing position P3 and a target passing position P4.

Next, in Step S117, the target passing position setter 55 determines whether the predicted passing position P3, seen from the viewpoint of the host vehicle C1, is located on the near side or the far side of the parked vehicle C3. When the predicted passing position P3 is located on the near side of the parked vehicle C3 as shown in FIG. 8(*b*), the processing proceeds to Step S118. When the predicted passing position P3 is located on the far side of the parked vehicle C3 as shown in FIG. 9(*b*), the processing proceeds to Step S119.

In Step S118, the target passing position setter 55 sets the target passing position P4 by moving the predicted passing position P3 out of the passing prohibited area R to the near side, as shown in FIG. 8(*b*). Specifically, the target passing position setter 55 obtains a deceleration DCC1 of the host vehicle C1 necessary to move the predicted passing position P3 to the target passing position P4. The deceleration DCC1 of the host vehicle C1 can be obtained using the speed V1 of the host vehicle C1, the speed V2 of the oncoming vehicle C2, the relative distance L1 between the host vehicle C1 and the oncoming vehicle C2, and the predicted passing position P3.

Figure 9A:
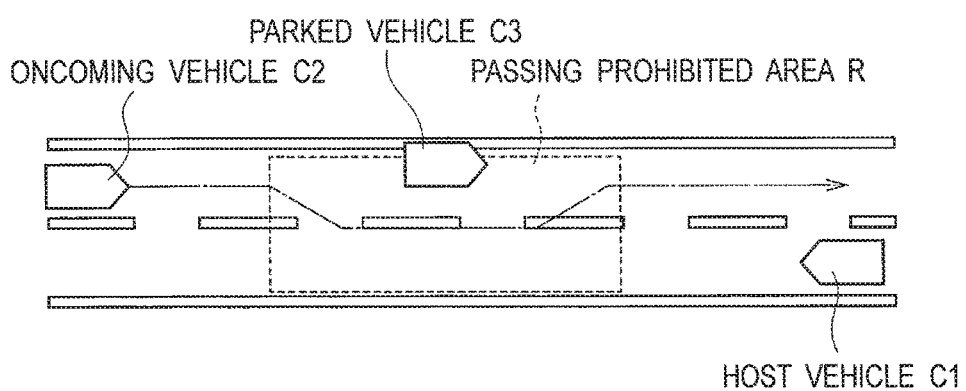
FIG. 9(a) is a diagram illustrating a scenario for performing passing control.
Figure 9B:
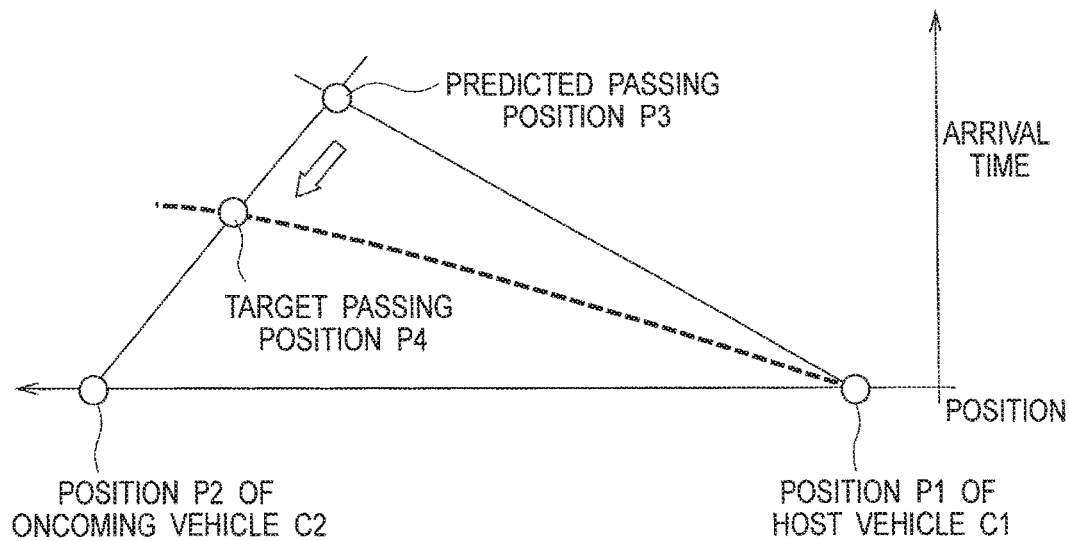
FIG. 9(b) is a diagram illustrating the predicted passing position P3 and the target passing position P4.

In Step S119, the target passing position setter 55 sets the target passing position P4 by moving the predicted passing position P3 out of the passing prohibited area R to the far side, as shown in FIG. 9(*b*). Specifically, the target passing position setter 55 obtains an acceleration ACC1 of the host vehicle C1 necessary to move the predicted passing position P3 to the target passing position P4. The acceleration ACC1 of the host vehicle C1 can be obtained using the speed V1 of the host vehicle C1, the speed V2 of the oncoming vehicle C2, the relative distance L1 between the host vehicle C1 and the oncoming vehicle C2, and the predicted passing position P3. The target passing position setter 55 may set an upper limit value for the acceleration ACC1, and when the acceleration ACC1 necessary to move the predicted passing position P3 to the target passing position P4 exceeds the upper limit value, set the target passing position P4 by moving the predicted passing position P3 out of the passing prohibited area R to the near side.

In Steps S114 and S115, the travel controller 56 causes the host vehicle V1 to travel for a certain period of time T while keeping the speed V1 thereof constant.

Figure 10A:
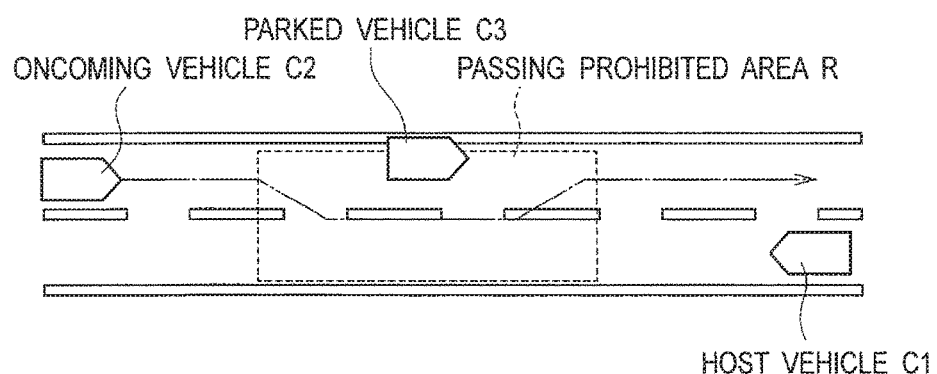
FIG. 10(a) is a diagram illustrating a scenario for performing passing control.
Figure 10B:
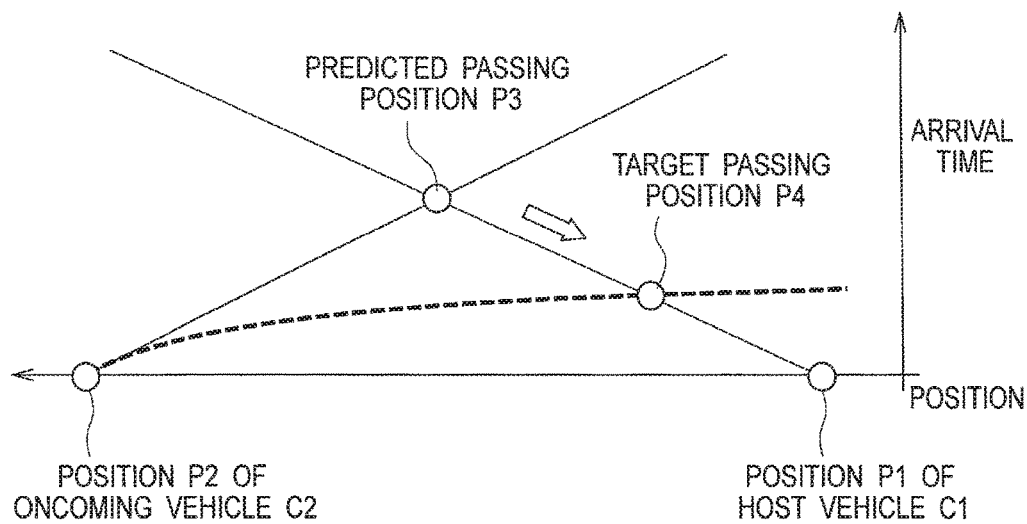
FIG. 10(b) is a diagram illustrating the predicted passing position P3 and the target passing position P4.
Figure 11A:
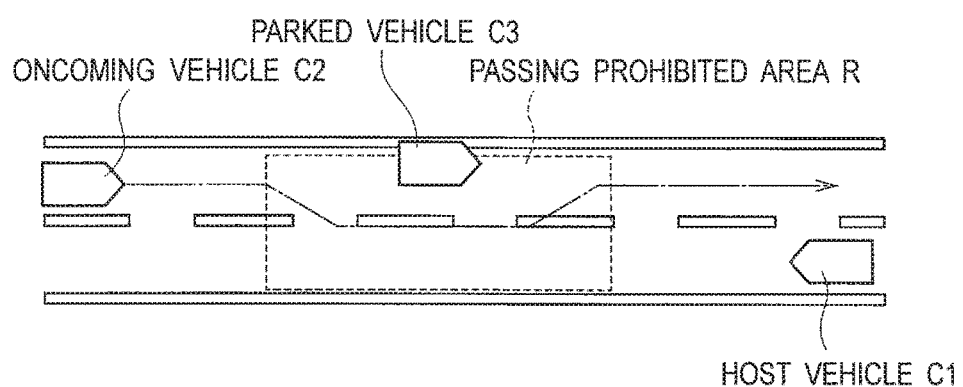
FIG. 11(a) is a diagram illustrating a scenario for performing passing control.
Figure 11B:
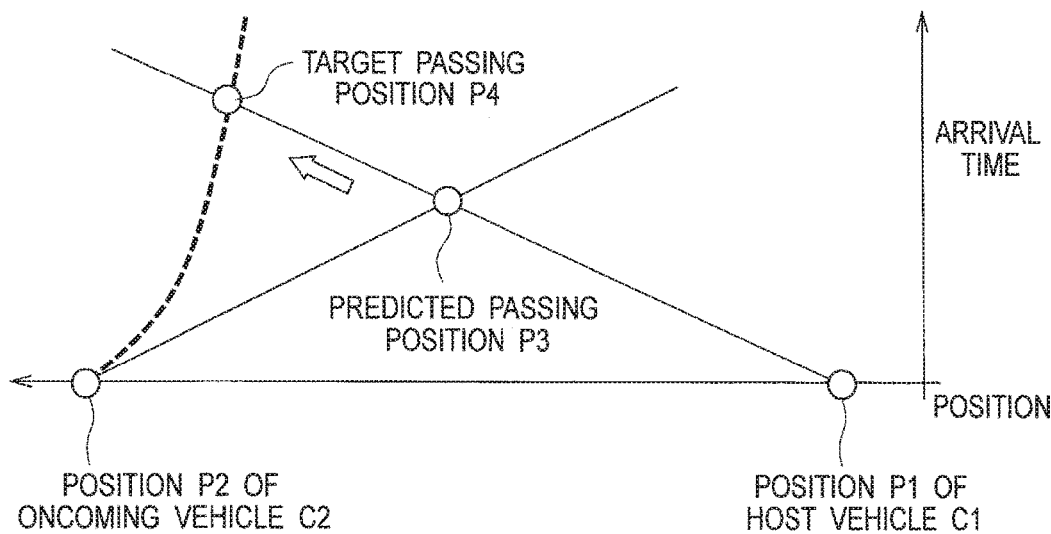
FIG. 11(b) is a diagram illustrating the predicted passing position P3 and the target passing position P4.

Next, in Step S116, the target passing position setter 55 determines again whether the predicted passing position P3 is at the center of the passing prohibited area R. When the target passing position setter 55 determines that the predicted passing position P3 is not at the center of the passing prohibited area R, the processing proceeds to Step S117. This case means that the predicted passing position P3 has moved out of the center of the passing prohibited area R after the certain period of time T because of acceleration or deceleration of the oncoming vehicle C2. For example, in a case where the oncoming vehicle C2 accelerates to consequently move the predicted passing position P3 out of the passing prohibited area R to the near side as shown in FIG. 10(b), the target passing position setter 55 sets the moved position as the target passing position P4 (Step S118). In another case where the oncoming vehicle C2 decelerates to consequently move the predicted passing position P3 out of the passing prohibited area R to the far side as shown in FIG. 11(b), the target passing position setter 55 sets the moved position as the target passing position P4 (Step S119).

Figure 12A:
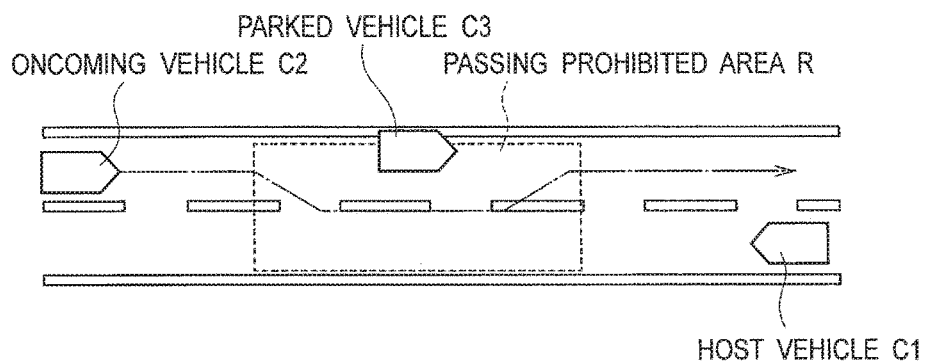
FIG. 12(a) is a diagram illustrating a scenario for performing passing control.
Figure 12B:
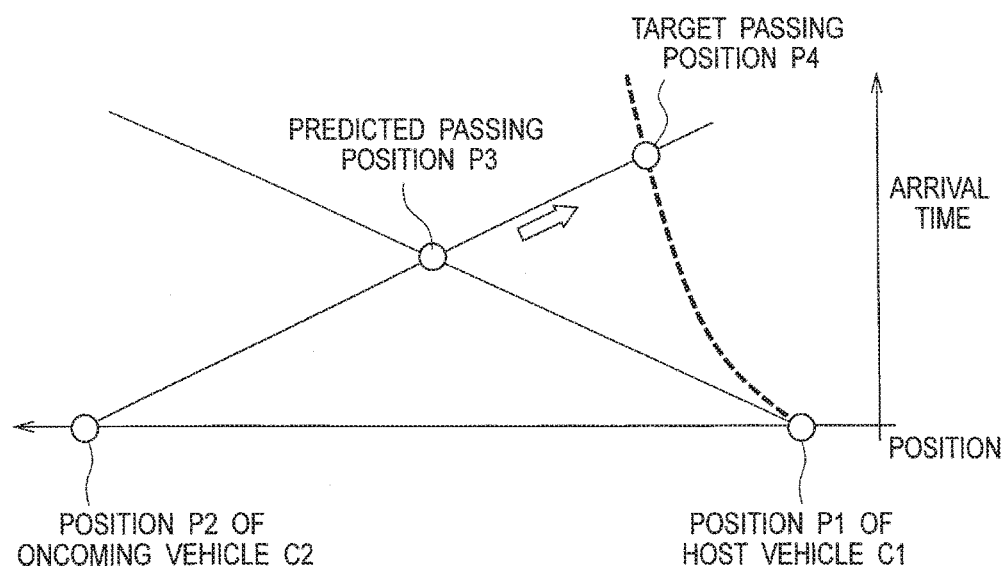
FIG. 12(b) is a diagram illustrating the predicted passing position P3 and the target passing position P4.

When the target passing position setter 55 determines in Step S116 that the predicted passing position P3 is at the center of the passing prohibited area R, i.e., when the predicted passing position P3 has not moved after the certain period of time T, the processing proceeds to Step S118. In this case, the target passing position setter 55 sets the target passing position P4 by moving the predicted passing position P3 out of the passing prohibited area R to the near side, as shown in FIG. 12(b). The certain period of time T can be set using the distance between the host vehicle C1 and the near-side border of the passing prohibited area R and the speed V1 of the host vehicle C1. Thereby, the host vehicle C1 can pass the oncoming vehicle C2 smoothly without decelerating abruptly even when the target passing position P4 is set on the near side in Step S118 or the far side in Step S119 after Step S116.

In Step S120, the travel controller 56 controls the actuator 60 of the host vehicle C1 so that the host vehicle C1 can pass the oncoming vehicle C2 at the target passing position P4, i.e., so that the host vehicle C1 may follow the target passing position P4. When the host vehicle C1 passes the oncoming vehicle C2 (YES in S121), the processing ends.

Figure 13A:
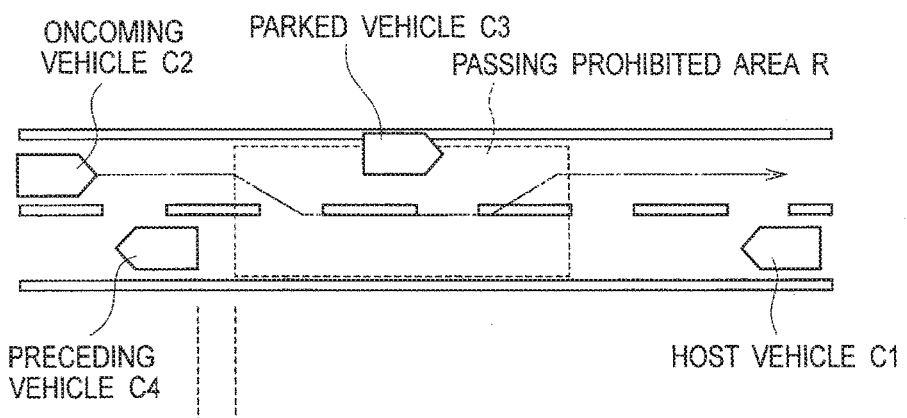
FIG. 13(a) is a diagram illustrating a scenario for performing passing control.

If there is a preceding vehicle C4 on the host-vehicle lane as shown in FIG. 13(a), the predicted passing position calculator 53 can use the speed V1 of the host vehicle C1, a speed V4 of the preceding vehicle C4, and an inter-vehicle distance L2 between the host vehicle C1 and the preceding vehicle C4 to generate a profile for the speed V1 (chronological data on the speed V1) which allows the inter-vehicle distance L2 not to fall to or below a predetermined value. Then, the predicted passing position calculator 53 can calculate the predicted passing position P3 using the profile for the speed V1, the speed V2 of the oncoming vehicle C2, and the relative distance L1 between the host vehicle C1 and the oncoming vehicle C2. This enables the host vehicle C1 to pass the oncoming vehicle C2 while maintaining the inter-vehicle distance L2 to the preceding vehicle C4.

Figure 13B:
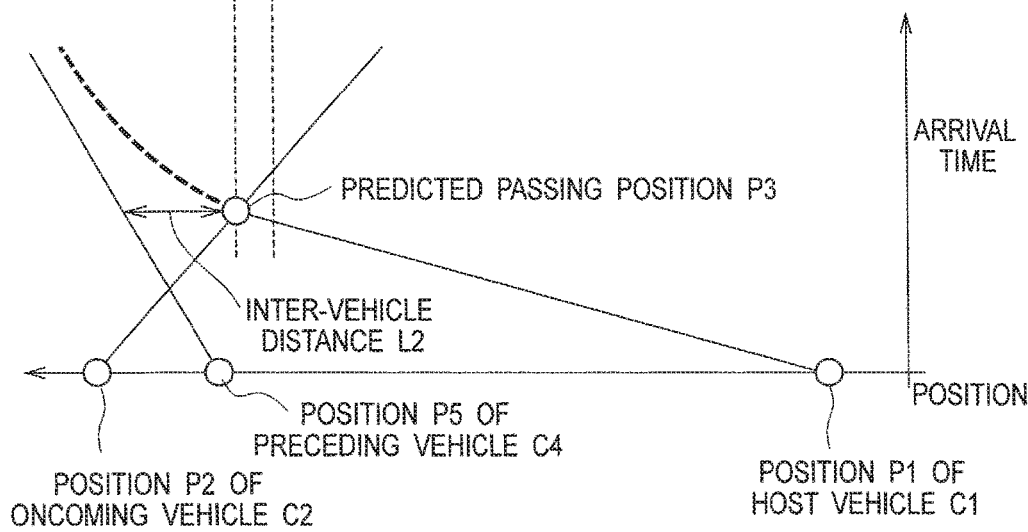
FIG. 13(b) is a diagram illustrating a margin for a passing prohibited area R.

In the case where there is the preceding vehicle C4 on the host-vehicle lane, the prohibited area setter 54 may extend the passing prohibited area R by adding a margin to the far side of the passing prohibited area R, as shown in FIG. 13(b). The prohibited area setter 54 sets the target passing position P4 out of the passing prohibited area R on the near side when a scenario such as the following is possible: the preceding vehicle C4 decelerates abruptly, and the host vehicle C1 decelerates but cannot maintain the inter-vehicle distance L2 at or above the predetermined value after passing the predicted passing position P3, as shown with the dotted line in FIG. 13(b). With the target passing position P4 being thus set, the host vehicle C1 can pass the oncoming vehicle C2 outside the passing prohibited area R while maintaining the inter-vehicle distance L2 at or above the predetermined value.

The prohibited area setter 54 may vary the margin according to the traffic conditions on the host-vehicle lane (crowdedness, information on a traffic signal located ahead, and information on a vehicle in front of the preceding vehicle). Thereby, the prohibited area setter 54 can set an appropriate margin allowing the host vehicle C1 to pass the oncoming vehicle C2 outside the passing prohibited area R while maintaining the inter-vehicle distance at or above the predetermined value.

As described, the vehicle control apparatus 10 according to the first embodiment sets the passing prohibited area R around the parked vehicle C3, calculates the predicted passing position P3 at which the host vehicle C1 passes the oncoming vehicle C2, and determines whether the predicted passing position P3 is within the passing prohibited area R. When determining that the predicted passing position P3 is within the passing prohibited area R, the vehicle control apparatus 10 controls the travel of the host vehicle C1 so that the predicted passing position P3 may move out of the passing prohibited area R. The host vehicle C1 can thereby pass the oncoming vehicle C2 outside the passing prohibited area R.

When the predicted passing position P3 is located on the near side (the host vehicle C1 side) of the center of the passing prohibited area R (the center being next to the right side of the parked vehicle C3), the vehicle control apparatus 10 according to the first embodiment decelerates the host vehicle C1 to move the predicted passing position P3 out of the passing prohibited area R to the near side. This enables the host vehicle C1 to pass the oncoming vehicle C2 outside the passing prohibited area R on the near side thereof.

When the predicted passing position P3 is located on the far side (the oncoming vehicle C2 side) of the center of the passing prohibited area R, the vehicle control apparatus 10 according to the first embodiment accelerates the host vehicle C1 to move the predicted passing position P3 out of the passing prohibited area R to the far side. This enables the host vehicle C1 to pass the oncoming vehicle C2 outside the passing prohibited area R on the far side thereof.

When the predicted passing position P3 is located at the center of the passing prohibited area R, the vehicle control apparatus 10 according to the first embodiment causes the host vehicle C1 to travel at a certain speed for a certain period of time. When the predicted passing position P3 is moved to the near side of the center of the passing prohibited area R thereafter, the vehicle control apparatus 10 decelerates the host vehicle C1 to move the predicted passing position P3 out of the passing prohibited area R to the near side. This enables the host vehicle C1 to pass the oncoming vehicle C2 outside the passing prohibited area R on the near side thereof.

When the predicted passing position P3 is located at the center of the passing prohibited area R, the vehicle control apparatus 10 according to the first embodiment causes the host vehicle C1 to travel at a certain speed for a certain period of time. When the predicted passing position P3 is moved to the far side of the center of the passing prohibited area R thereafter, the vehicle control apparatus 10 accelerates the host vehicle C1 to move the predicted passing position P3 out of the passing prohibited area R to the far side. This enables the host vehicle C1 to pass the oncoming vehicle C2 outside the passing prohibited area R on the far side thereof.

When the predicted passing position P3 is located at the center of the passing prohibited area R, the vehicle control apparatus 10 according to the first embodiment causes the host vehicle C1 to travel at a certain speed for a certain period of time. When the predicted passing position P3 does not move from the center of the passing prohibited area R thereafter, the vehicle control apparatus 10 according to the first embodiment decelerates the host vehicle C1 to move the predicted passing position P3 out of the passing prohibited area R to the near side. This enables the host vehicle C1 to pass the oncoming vehicle C2 outside the passing prohibited area R on the near side thereof.

When there is the preceding vehicle C4 on the host-vehicle lane, the vehicle control apparatus 10 according to the first embodiment generates a profile for the speed V1 which allows the inter-vehicle distance L2 between the host vehicle C1 and the preceding vehicle C4 not to fall to or below the predetermined value. The vehicle control apparatus 10 calculates the predicted passing position P3 using this profile for the speed V1. When determining that the predicted passing position P3 is within the passing prohibited area R, the vehicle control apparatus 10 controls the travel of the host vehicle C1 to move the predicted passing position P3 out of the passing prohibited area R. This enables the host vehicle C1 to pass the oncoming vehicle C2 while maintaining the inter-vehicle distance L2 to the preceding vehicle C4.

The vehicle control apparatus 10 according to the first embodiment extends the passing prohibited area R by adding a margin to the far side of the passing prohibited area R. If the predicted passing position P3 is in the margin, the vehicle control apparatus 10 decelerates the host vehicle C1 to move the predicted passing position P3 out of the passing prohibited area R to the near side, when a scenario such as the following is possible: the preceding vehicle C4 decelerates abruptly, and the host vehicle C1 cannot maintain the inter-vehicle distance L2 at or above the predetermined value after passing the predicted passing position P3. This enables the host vehicle C1 to pass the oncoming vehicle C2 while maintaining the inter-vehicle distance L2 at or above the predetermined value.

The vehicle control apparatus 10 according to the first embodiment varies the margin according to traffic conditions on the host-vehicle lane. Thus, the margin can be set appropriately to allow the host vehicle C1 to pass the oncoming vehicle C2 outside the passing prohibited area R while maintaining the inter-vehicle distance L2 at or above the predetermined value.

Second Embodiment

Figure 14:
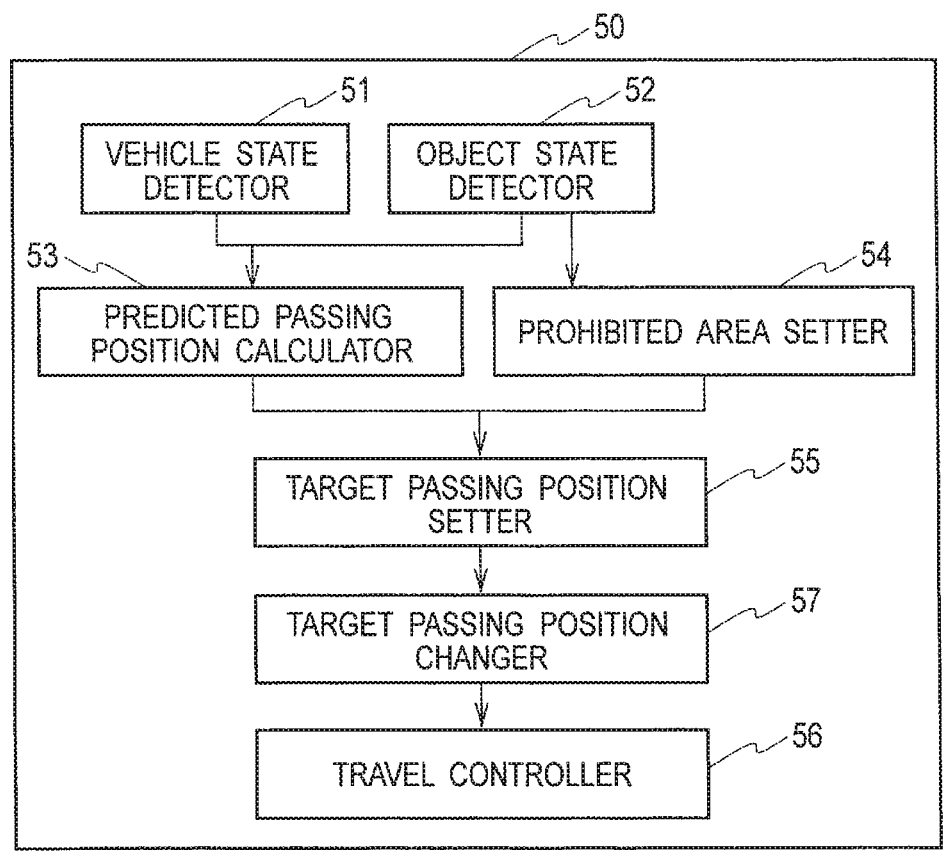
FIG. 14 is a block diagram showing the functional configuration of a controller 50 of a vehicle control apparatus 10 according to a second embodiment of the present invention.

Next, a second embodiment of the present invention is described. The second embodiment differs from the first embodiment in that the controller 50 includes a target passing position changer 57 as shown in FIG. 14. In the second embodiment, the same components as those described in the first embodiment are denoted by the same reference signs as those used in the first embodiment, and are not described in detail below.

Figure 15A:
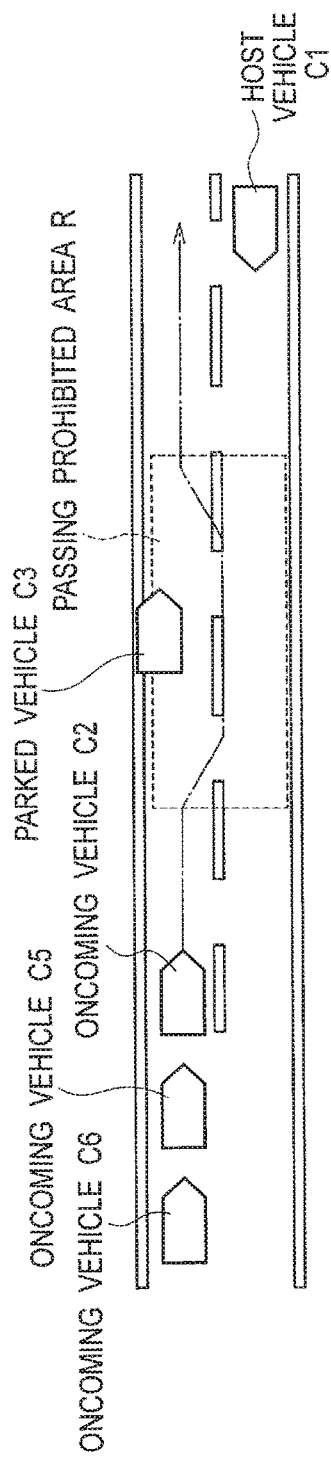
FIG. 15(a) is a diagram illustrating a scenario for performing passing control.
Figure 15B:
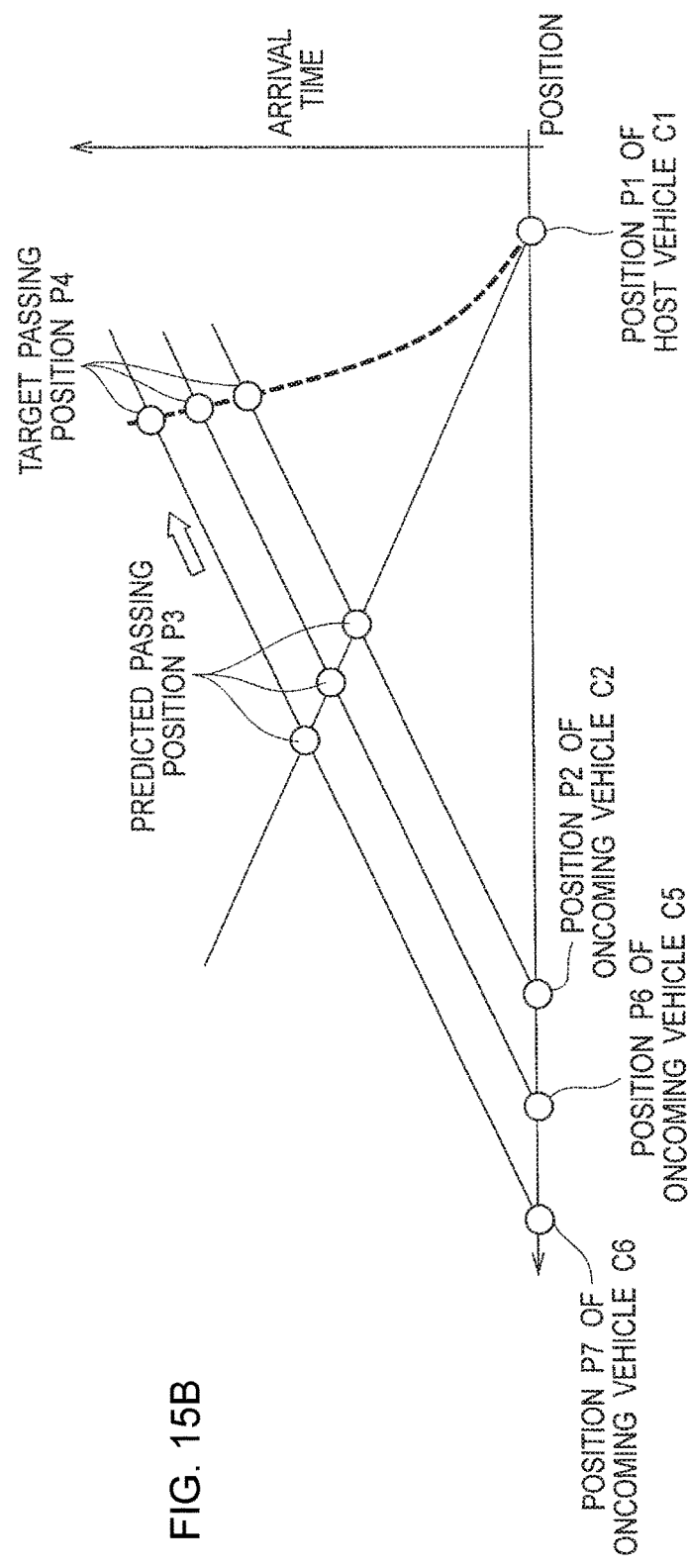
FIG. 15(b) is a diagram illustrating the predicted passing positions P3 and the target passing positions P4.

A description is now given of the target passing position changer 57 with reference to FIG. 15. In a scenario considered below, an oncoming vehicle C5 and an oncoming vehicle C6 follow the oncoming vehicle C2 as shown in FIG. 15, or in other words, there are multiple oncoming vehicles. The predicted passing position calculator 53 calculates the predicted passing position P3 of the host vehicle C1 for each of these oncoming vehicles. The target passing position changer 57 changes the set target passing positions P4 to the near side or the far side of the passing prohibited area R according to the number of the predicted passing positions P3, i.e., the number of the oncoming vehicles. Specifically, the target passing position changer 57 can change the target passing positions P4 to the near side when the number of the oncoming vehicles is smaller than a preset threshold, and changes the target passing positions P4 to the far side when the number of the oncoming vehicles is larger than the threshold. For example, in the example in FIG. 15 where there are three vehicles on the oncoming lane, if the threshold is set to four, the target passing position changer 57 changes the target passing positions P4 to the near side so that the host vehicle C1 may give way to the oncoming vehicles. This can prevent a traffic jam up caused by the oncoming vehicles waiting to pass the parked vehicle C3 on the oncoming lane. The threshold can be varied according to road conditions.

Third Embodiment

Figure 16:
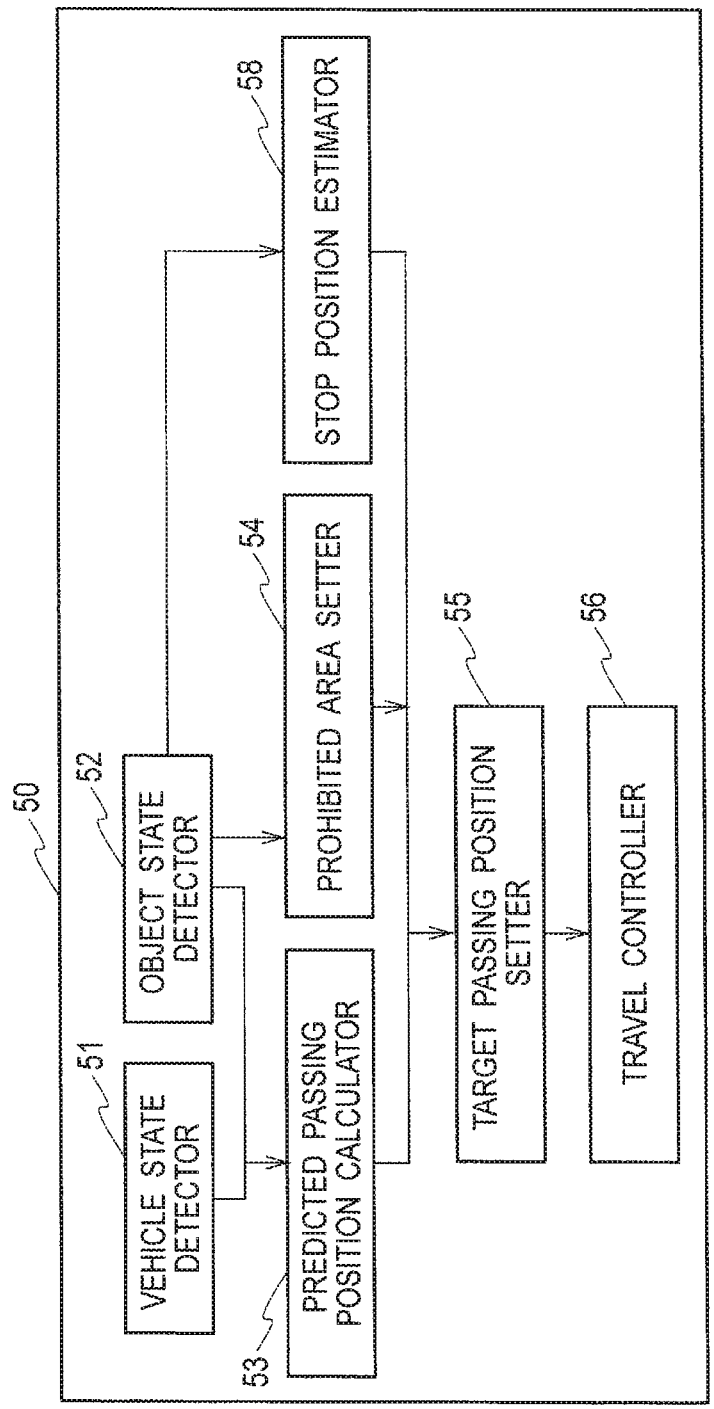
FIG. 16 is a block diagram showing the functional configuration of a controller 50 of a vehicle control apparatus 10 according to a third embodiment of the present invention.

Next, a third embodiment of the present invention is described. The third embodiment differs from the first embodiment in that the controller 50 includes a stop position estimator 58 as shown in FIG. 16. In the third embodiment, the same components as those described in the first embodiment are denoted by the same reference signs as those used in the first embodiment, and are not described in detail below.

The stop position estimator 58 acquires the maximum deceleration of the oncoming vehicle C2 using, for example, vehicle-to-vehicle communication with the oncoming vehicle C2, and estimates the shortest stop position of the oncoming vehicle C2 if the oncoming vehicle C2 decelerates at its maximum deceleration. The stop position estimator 58 then outputs the estimated shortest stop position of the oncoming vehicle C2 to the target passing position setter 55.

Then, when determining that the estimated shortest stop position of the oncoming vehicle C2 is at the center of the passing prohibited area R, i.e., the oncoming vehicle C2 cannot stop at the far side of the passing prohibited area R even with its maximum deceleration, the target passing position setter 55 decelerates the host vehicle C1 to move the predicted passing position P3 out of the passing prohibited area R to the near side. This can prevent the host vehicle C1 from blocking the travel path of the oncoming vehicle C2.

The stop position estimator 58 may acquire the current deceleration of the oncoming vehicle C2 using, for example, vehicle-to-vehicle communication with the oncoming vehicle C2, and output this deceleration to the predicted passing position calculator 53. This enables the predicted passing position calculator 53 to calculate the predicted passing position P3 while taking the current deceleration of the oncoming vehicle C2 into consideration. When the predicted passing position P3 is outside the prohibited area R on the far side thereof due to deceleration of the oncoming vehicle C2, it is determined that the oncoming vehicle C2 has given way to the host vehicle C1. Thus, the host vehicle C1 can accelerate and pass the side of the parked vehicle C3 fast. Additionally, the wait time for the oncoming vehicle C2 can be shortened.

Although the embodiments of the present invention have been described above, descriptions and the drawings that constitute part of the present disclosure should not be construed as limiting the present invention. The present disclosure should make various alternative embodiments, examples, and operation techniques apparent to those skilled in the art. For example, when the oncoming vehicle C2 is stopped, the predicted passing position calculator 53 may calculate the predicted passing position P3 by replacing the speed V2 of the oncoming vehicle C2 with a corrected speed V2'. The corrected speed V2' may be a constant speed (10 km/h) or may be varied according to the period of time for which the oncoming vehicle C2 is stopped or according to the traffic conditions on the host-vehicle lane and the oncoming lane. This can prevent the predicted passing position P3 from being located on the far side of the passing prohibited area R and shorten the wait time for the oncoming vehicle C2.

In addition, when the host vehicle C1 is stopped, the predicted passing position calculator 53 may calculate the predicted passing position P3 by replacing the speed V1 of the host vehicle C1 with a corrected speed V1'. The corrected speed V1' may be a constant speed (10 km/h) or may be varied according to the period of time for which the host vehicle C1 is stopped or the traffic conditions on the host-vehicle lane and the oncoming lane. This can prevent the predicted passing position P3 from being located on the near side of the passing prohibited area R and shorten the wait time for the host vehicle C1.

REFERENCE SIGNS LIST 51 vehicle state detector (state detector)
52 object state detector (object detector)
53 predicted passing position calculator (position calculator)
54 prohibited area setter (area setter)
56 travel controller
58 stop position estimator

The invention claimed is:

1. A vehicle control apparatus comprising:
a state detector configured to detect position and speed of a host vehicle;
an object detector configured to detect position and speed of each of a stationary object and a moving object which are ahead of the host vehicle;
a position calculator configured to calculate a passing position at which the host vehicle passes the moving object, based on the position and the speed of the host vehicle and the position and the speed of the moving object;
an area setter configured to set an area around the stationary object; and
a travel controller configured to determine where the passing position is with respect to the area and controls travel of the host vehicle to move the passing position out of the area,
wherein:
when the travel controller determines the passing position is at a center of the area, the travel controller causes the host vehicle to travel at a certain speed for a certain period of time, and
when the travel controller determines the passing position is moved toward the host vehicle after the certain period of time, the travel controller decelerates the host vehicle to move the passing position out of the area toward the host vehicle.

2. The vehicle control apparatus according to claim 1, wherein when the object detector detects a preceding vehicle on a lane of the host vehicle, the position calculator generates a profile of the speed of the host vehicle which allows an inter-vehicle distance between the host vehicle and the preceding vehicle to be equal to or larger than a predetermined value, and calculates the passing position using this profile.

3. The vehicle control apparatus according to claim 2, wherein
the area setter extends the area by adding a margin to the moving object side of the area.

4. The vehicle control apparatus according to claim 3, wherein
the area setter sets the margin according to a traffic condition on the lane of the host vehicle.

5. The vehicle control apparatus according to claim 1, wherein
when the object detector detects a plurality of moving objects, the position calculator calculates the passing position for each of the moving objects,
when the number of the moving objects is smaller than a predetermined number, the travel controller decelerates the host vehicle to move all the passing positions out of the area toward the host vehicle, and
when the number of the moving objects is larger than the predetermined number, the travel controller accelerates the host vehicle to move all the passing positions out of the area toward the moving objects.

6. The vehicle control apparatus according to claim 1, further comprising:
a stop position estimator configured to calculate a shortest stop position of the moving object based on the speed of the moving object and maximum deceleration preset for the moving object, wherein
when the shortest stop position is at a center of the area, the travel controller decelerates the host vehicle to move the passing position out of the area toward the host vehicle.

7. The vehicle control apparatus according to claim 1, further comprising:
a stop position estimator configured to calculate a stop position of the moving object based on the speed of the moving object detected by the object detector and deceleration of the moving object, wherein
when the stop position is within the area at a position closer to the moving object than a center of the area is, the travel controller accelerates the host vehicle to move the passing position out of the area toward the moving object.

8. The vehicle control apparatus according to claim 1, wherein
when the moving object is stopped, the position calculator calculates the passing position by replacing the speed of the moving object with a first corrected speed.

9. The vehicle control apparatus according to claim 1, wherein
when the host vehicle is stopped, the position calculator calculates the passing position by replacing the speed of the host vehicle with a second corrected speed.

10. A vehicle control apparatus comprising:
a state detector configured to detect position and speed of a host vehicle;
an object detector configured to detect position and speed of each of a stationary object and a moving object which are ahead of the host vehicle;
a position calculator configured to calculate a passing position at which the host vehicle passes the moving object, based on the position and the speed of the host vehicle and the position and the speed of the moving object;
an area setter configured to set an area around the stationary object; and
a travel controller configured to determine where the passing position is with respect to the area and controls travel of the host vehicle to move the passing position out of the area,
wherein when the travel controller determines the passing position is at a center of the area, the travel controller causes the host vehicle to travel at a certain speed for a certain period of time, and when the travel controller determines the passing position is moved toward the moving object after the certain period of time, the travel controller accelerates the host vehicle to move the passing position out of the area toward the moving object.

11. A vehicle control apparatus comprising:
a state detector configured to detect position and speed of a host vehicle;
an object detector configured to detect position and speed of each of a stationary object and a moving object which are ahead of the host vehicle;
a position calculator configured to calculate a passing position at which the host vehicle passes the moving object, based on the position and the speed of the host vehicle and the position and the speed of the moving object;
an area setter configured to set an area around the stationary object; and
a travel controller configured to determine where the passing position is with respect to the area and controls travel of the host vehicle to move the passing position out of the area,
wherein when the travel controller determines the passing position is at a center of the area, the travel controller causes the host vehicle to travel at a certain speed for a certain period of time, and
when the travel controller determines the passing position is not moved after the certain period of time, the travel controller decelerates the host vehicle to move the passing position out of the area toward the host vehicle.

* * * * *